United States Patent [19]
Avidan

[11] Patent Number: 5,921,020
[45] Date of Patent: Jul. 13, 1999

[54] METHOD FOR PRODUCING LIVE FENCE UNITS

[75] Inventor: Ofer Avidan, Kfar Veradim, Israel

[73] Assignees: Koby Gil, Tiuon, Israel; Zui Rubinstein, Tintat, Israel

[21] Appl. No.: 08/839,046

[22] Filed: Apr. 23, 1997

[51] Int. Cl.$^6$ ..................................................... A01G 9/12
[52] U.S. Cl. ................................................. 47/4; 47/33
[58] Field of Search .............................. 47/4, 33, 42, 70, 47/79, 83, 85, 44, 47, 65.9, 66.1; 504/174, 179, 190, 199

[56] References Cited

U.S. PATENT DOCUMENTS

| | | | |
|---|---|---|---|
| H824 | 10/1990 | Ghafoorzai ................................... | 47/70 |
| 2,988,850 | 6/1961 | Hechinger ................................... | 47/4 X |
| 3,389,499 | 6/1968 | Haile ........................................... | 47/33 |
| 4,059,431 | 11/1977 | Takematsu et al. ...................... | 504/199 |
| 4,319,026 | 3/1982 | Hedrich et al. ....................... | 504/179 X |
| 4,336,667 | 6/1982 | Evans ........................................... | 47/4 |
| 4,665,647 | 5/1987 | Behrens et al. .............................. | 47/83 |
| 4,897,955 | 2/1990 | Winsor ........................................ | 47/33 |
| 5,257,476 | 11/1993 | Fukuzumi .................................... | 47/83 |
| 5,524,387 | 6/1996 | Whisenant .................................. | 47/79 |

FOREIGN PATENT DOCUMENTS 2410457  8/1979  France ......................................... 47/33

OTHER PUBLICATIONS

U.S. Commissioner of Patents, Report for Agriculture for the Year 1854, p. 406, Jan. 1855.

*Primary Examiner*—Michael J. Carone
*Assistant Examiner*—Elizabeth Shaw
*Attorney, Agent, or Firm*—Mark M. Friedman

[57] ABSTRACT

A method for producing a ready-to-plant live fence unit includes providing an elongated container containing a growing medium, planting within the container at least two plants, and cultivating the plants to grow in an interlocked manner to a substantially uniform approximate desired height so as to form a ready-to-plant live fence unit. Preferably, the cultivation includes treating the plants with a chemical pruning agent so as to limit their vertical growth to the approximate desired height. The method also preferably includes providing a vertical trellis adjacent to the container, and treating the plants with a growth regulator which accelerates growth. In an alternative implementation, the live fence unit may be produced even from a single plant cultivated asymmetrically to have a length which is at least about three times its width.

20 Claims, 4 Drawing Sheets ered. U.S. Pat. No. 5,561,947 to Greenarch et al. discloses a V-shaped crate which is intended to facilitate transplanting of a number of plants growing in a row. This reduces the labor of the initial transplantation of plants to form a hedge. However, considerable labor is still required to dissemble all the crates used. Furthermore, the subsequent upkeep required to cultivate the hedge, as well as the time taken for it to grow to the required dimensions, is still a major deterrent to extensive use of hedging.

METHOD FOR PRODUCING LIVE FENCE UNITS

FIELD AND BACKGROUND OF THE INVENTION

The present invention relates to fences made from plants and, in particular, it concerns a method for producing ready-to-plant live fence units.

It is known to use hedges of various types of plants as fences or barriers. Hedges are generally considered more attractive than artificial fences, while functioning effectively as a barrier to people and large animals, and affording privacy from onlookers.

In spite of these advantages, the use of hedges has a number of disadvantages. Firstly, a newly planted hedge may take a number of years to grow sufficiently to be effective as a barrier. During this period, an alternative barrier must be erected. This leads to additional expense, and frequently results in an unsightly interim arrangement.

It is possible to produce a hedge more quickly by transplanting a number of previously grown plants into a row. Such a procedure is very labor intensive, and therefore expensive. Furthermore, extensive care is required subsequently to ensure that the plants grow into the shape of hedge required.

U.S. Pat. No. 5,561,947 to Greenarch et al. discloses a V-shaped crate which is intended to facilitate transplanting of a number of plants growing in a row. This reduces the labor of the initial transplantation of plants to form a hedge. However, considerable labor is still required to dissemble all the crates used. Furthermore, the subsequent upkeep required to cultivate the hedge, as well as the time taken for it to grow to the required dimensions, is still a major deterrent to extensive use of hedging.

In the field of ornamental, and especially indoor, cut-flower, and outdoor plants, it is known to use chemical pruning agents to produce a more densely branched structure. Examples of chemical pruning agents include organic fatty acids and organic methyl esters, such as dimethyl sulfoxide.

There is therefore a need for a commercially viable method for producing ready-to-plant live fence units which are easily planted to provide an instant live fence of required dimensions.

SUMMARY OF THE INVENTION

The present invention is a method for producing a ready-to-plant live fence unit.

According to the teachings of the present invention there is provided, a method for producing a ready-to-plant live fence unit comprising: (a) providing a container containing a growing medium, the container being elongated in a first dimension; (b) planting within the container at least two plants arrayed along the first dimension; and (c) cultivating the at least two plants such that they grow in an interlocked manner to a substantially uniform approximate desired height so as to form a ready-to-plant live fence unit.

According to a further feature of the present invention, the cultivating includes treating the at least two plants with a chemical pruning agent so as to increase horizontal growth of the at least two plants.

According to a further feature of the present invention, the container is a flexible bag.

According to a further feature of the present invention, the bag is made from biodegradable material.

According to a further feature of the present invention, a secondary support around the bag is provided for supporting the bag.

According to a further feature of the present invention, a vertical trellis is provided adjacent to the container and extending parallel to the first dimension for guiding growth of the at least two plants.

According to a further feature of the present invention, the at least two plants are treated with a growth regulator which accelerates growth.

According to a further feature of the present invention, the growth regulator is a Gibberellin.

According to a further feature of the present invention, the chemical pruning agent is chosen from the group: organic fatty acids and organic methyl esters.

According to a further feature of the present invention, the chemical pruning agent is dimethyl sulfoxide.

There is also provided according to the teachings of the present invention, a method for producing a ready-to-plant live fence unit comprising: (a) providing a container containing a growing medium; (b) planting within the container at least one plant; and (c) cultivating the at least one plant to grow asymmetrically such that the at least one plant extends so as to have a first horizontal dimension termed "width" and a second horizontal dimension substantially perpendicular to the first horizontal dimension termed "length", the length being at least about three times greater than the width so as to form a ready-to-plant live fence unit.

According to a further feature of the present invention, the length is at least about four times greater than the width.

According to a further feature of the present invention, the cultivating includes treating the at least one plant with a chemical pruning agent so as to increase horizontal growth of the at least one plant.

According to a further feature of the present invention, the container is a flexible bag.

According to a further feature of the present invention, the bag is made from biodegradable material.

According to a further feature of the present invention, a secondary support around the bag is provided for supporting the bag.

According to a further feature of the present invention, a vertical trellis is provided adjacent to the container and extending parallel to the length for guiding growth of the at least one plant.

According to a further feature of the present invention, the at least one plant is treated with a growth regulator which accelerates growth.

According to a further feature of the present invention, the chemical pruning agent is chosen from the group: organic fatty acids and organic methyl esters.

According to a further feature of the present invention, the chemical pruning agent is dimethyl sulfoxide.

BRIEF DESCRIPTION OF THE DRAWINGS

The invention is herein described, by way of example only, with reference to the accompanying drawings, wherein.

DESCRIPTION OF THE PREFERRED EMBODIMENTS

The present invention is a method for producing a ready-to-plant live fence unit.

The principles and operation of methods according to the present invention may be better understood with reference to the drawings and the accompanying description.

Figure 1:
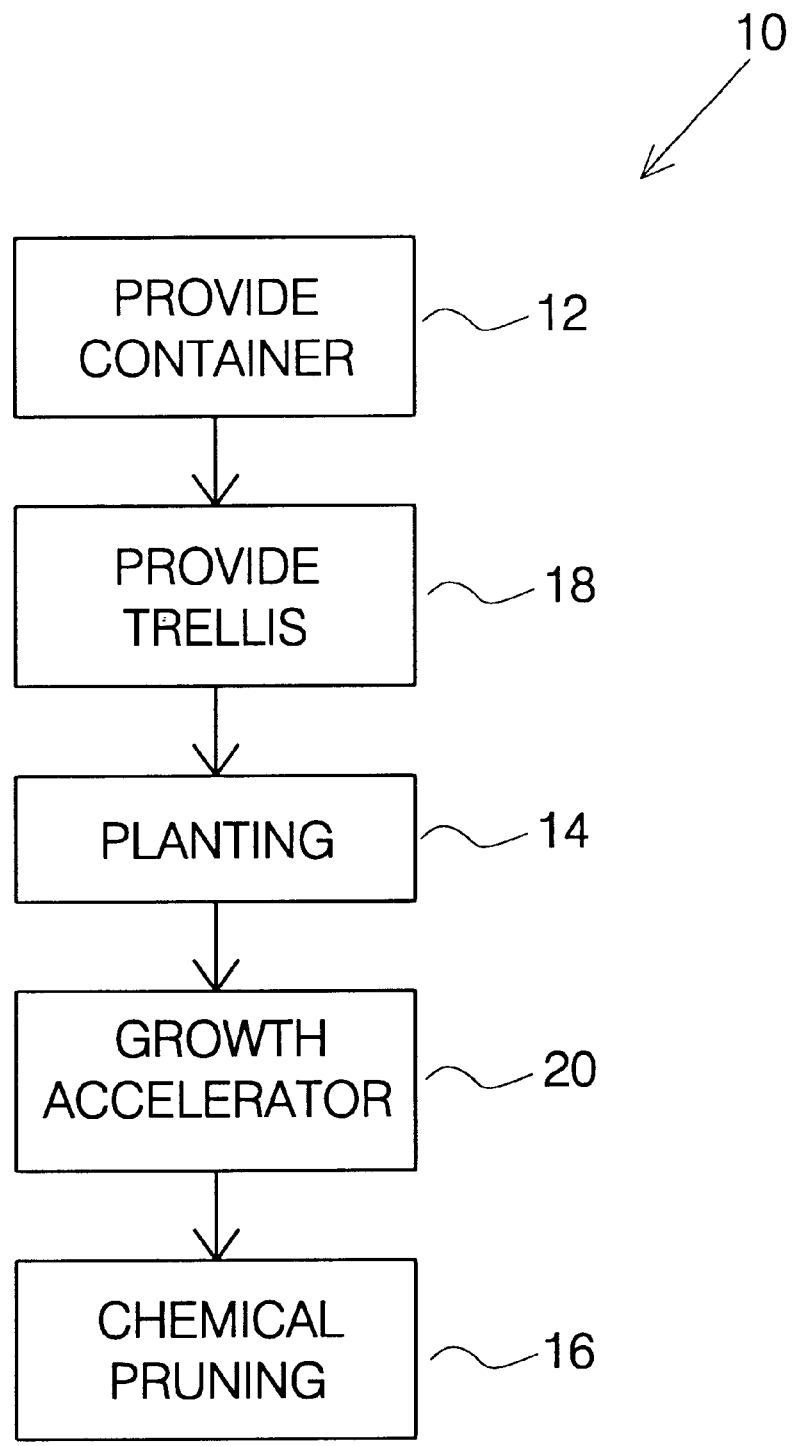
FIG. 1 is a flow diagram of a method for producing a ready-to-plant live fence unit, constructed and operative according to the teachings of the present invention.

Referring now to the drawings, FIG. 1 shows a flow diagram of a method, generally designated 10, according to the teachings of the present invention, for producing a ready-to-plant live fence unit. Generally speaking, method 10 according to a first implementation includes providing an elongated container containing a growing medium (step 12), planting within the container at least two plants arrayed along a line (step 14), and cultivating the plants so that they grow in an interlocked manner to a substantially uniform approximate desired height so as to form a ready-to-plant live fence unit. The cultivation of the plants preferably includes treating the plants with a chemical pruning agent so as to limit their vertical growth to an approximate desired height (step 16). Method 10 also preferably includes a step 18 of providing a vertical trellis adjacent to the container, and a step 20 of treating the plants with a growth regulator which accelerates growth.

It is a particular feature of preferred methods of present invention that one or more chemical pruning agent is used to affect growth of the plants. The use of a chemical pruning agent serves a dual purpose, simultaneously limiting upward growth of the terminal parts of the plants and inducing lateral growth. The effect of this treatment is that the plants become optimally conditioned for fencing, being of the required height and tightly interlocking with adjacent plants to form both a physical barrier and a sight barrier. The use of chemical growth regulators during production of the fence units also eliminates, or greatly reduces, the need for trimming, thereby minimizing production costs of the fence units.

The term "live fence" is used herein, in the specification and claims, to refer to any fence, barrier or partition of which live plants form a part. The plants are preferably the majority, and typically the only, component of the fence. However, in certain applications such as, for example, a security fence, it may be preferable to combine the plants with a secondary fence structure. The secondary structure may be either as a reinforcement for the plant component, or an essentially self-supporting fence structure. In the latter case, the plants add aesthetically to the fence, and may function as a sight barrier.

It should be appreciated that the method of the present invention may be applied to a very wide range of plants which, when growing alone, would be classified as shrubs, bushes or trees. The term "plant" is used to refer generically to any of the above. The specific choice of plant type depends on local climatic conditions and on the desired appearance, strength and other characteristics of the final fence.

The term "planting" is used herein, in the specification and claims, to refer to any procedure which results in a plant growing in a given location. Thus, planting is defined to include sowing of seeds, planting of fruits and transplanting of seedlings, as well more complicated procedures including grafting and layering.

The term "substantially straight line" is used herein, in the specification and claims, to refer to any arrangement of plants which is conducive to producing a straight section of live fence. As will be readily clear to one skilled in the art, this does not require precise collinear arrangement of the bases of the plants. In fact, depending on the type of plants used and the thickness of live fence required, it may be preferable to slightly stagger the position of adjacent plants to produce a zigzag formation. However, even in such a case, since the major spacing between adjacent plants remains the main extensional direction of the intended live fence section, the formation is referred to as "substantially straight".

It should also be appreciated that the present invention is not limited to straight units. Specifically, arcuate and/or angled units may be provided for use alone, or together with straight units, to produce live fences of required shapes. In this context, the plants are considered to be arrayed along an "extensional direction" of the live fence unit, where the extensional direction may vary along the fence unit so as to correspond to a straight, curved or angled shape of the desired fence unit.

The live fence units of the present invention will also be described as attaining a "substantially uniform approximate desired height". It should be noted that the terms "substantially uniform" and "approximate desired height" are not intended to exclude some degree of aesthetic shaping or sculpturing. In fact, it is frequently preferable to produce an attractive, somewhat undulating or otherwise modulated upper profile to the live fence units. However, the height of each fence unit typically remains within roughly 10% of the nominal fence unit height and is therefore described as having a substantially uniform approximate desired height.

Figure 2:
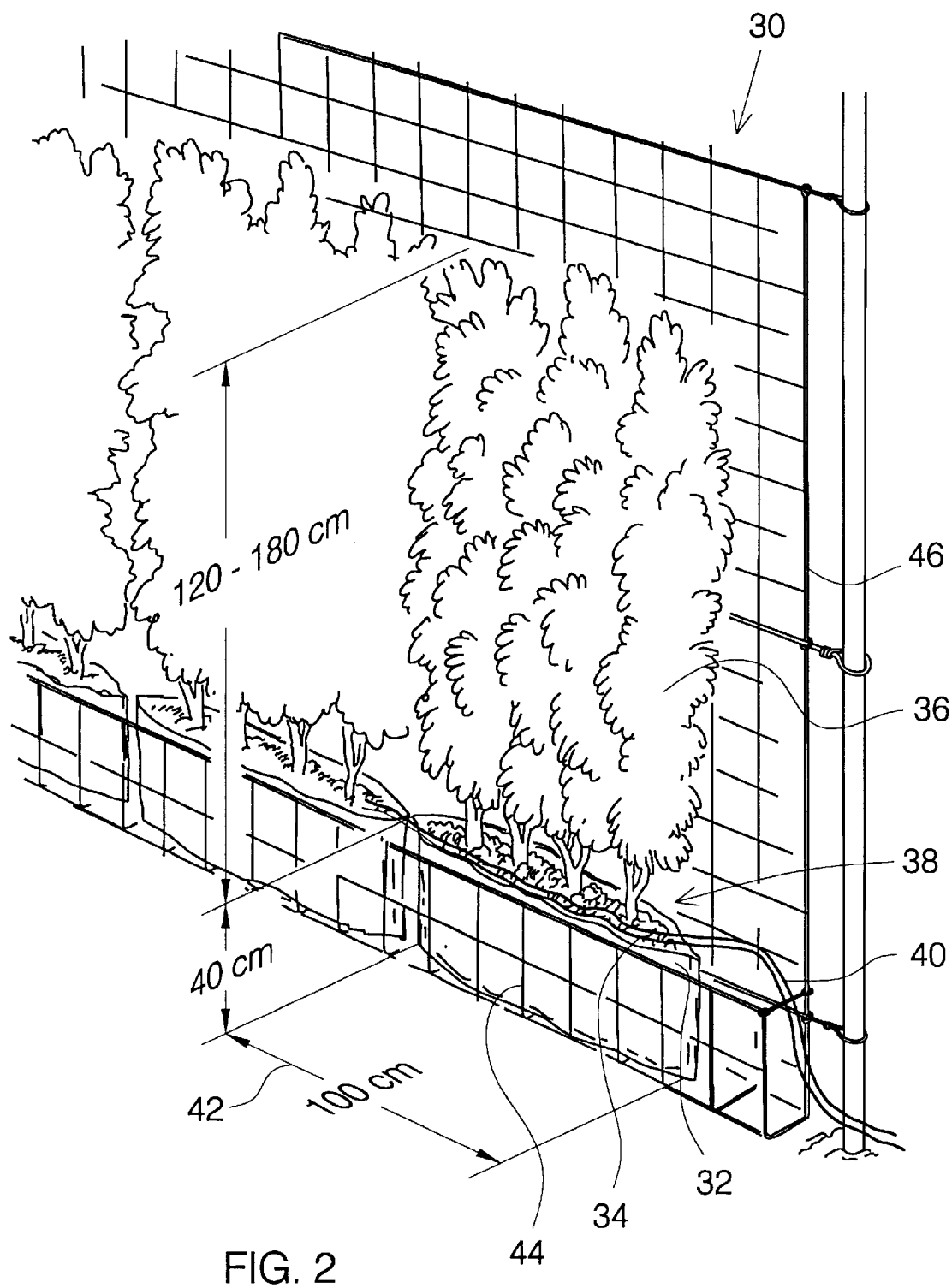
FIG. 2 is a schematic perspective view of a number of live fence units being produced by the method of FIG. 1.

Turning now to the steps of method 10 in more detail, FIG. 2 shows an example of an apparatus, generally designated 30, constructed and operative according to the teachings of the present invention, for use in implementing method 10. Thus, apparatus 30 includes a container 32 containing a growing medium 34 in which a number of plants 36 have been planted. Container 32, growing medium 34 and plants 36 together make up a live fence unit 38, ready for planting. Apparatus 30 also typically includes a system of irrigation tubes 40 through which water, nutrients, and when required, growth regulators can be 20 supplied.

Container 32 is elongated in a first horizontal dimension 42, hereafter termed its length, corresponding to the intended extensional direction of the live fence unit 38. A perpendicular horizontal dimension is termed its width. The depth and width of container 32 are chosen to be sufficient to accommodate a healthy root system of a plant of the type to be used when it has grown to the height of the live fence to be produced. Although these dimensions vary considerably according to the type of plant used, for a live fence between about 120 and about 180 cm tall, the depth is typically less than about 50 cm, and preferably between about 30 and about 40 cm, and the width is typically less than about 30 cm, and preferably between about 10 and about 20 cm.

The length of container 32 is at least sufficient to provide space for the root systems of the number of plants 36 in the container. Typically, the length is greater than that required by the roots to generate the correct degree of interlocking of the foliage of adjacent plants. The degree of overlap should be sufficient to ensure a fairly uniform, continuous fence appearance, and to provide a sight barrier and/or mechanical resistance against someone trying to push between the plants. However, excessive overlap is undesirable and wasteful. Additionally, the length is preferably chosen to be some simple fraction or multiple of a common unit of measurement so as to facilitate calculation of the number of live fence units required for a given length of fence. For a live fence between about 120 and about 180 cm tall, a length of about 1 m is typically suitable for about four plants, dependent on the type of plant. It should be noted that details of the shape of container 32 are not critical to the present invention. The dimensions mentioned generally relate to the maximum measurement in any dimension, corresponding to the necessary dimensions of an excavated trench which can receive container 32 or its contents.

In a preferred implementation of the present invention as illustrated, container 32 is a flexible bag. This has the advantages of providing a low-cost, light-weight packaging suitable for retail of the live fence units. In this case, apparatus 30 preferably includes a secondary support structure 44 around the bag to support its sides. FIG. 2 shows a preferred implementation in which support structure 44 is constructed as a pair of parallel framework walls, one of which extends upwards so as to be integrally formed with a trellis 46.

Preferably, the bag is made from a biodegradable material such as biodegradable plastics or cloth material. This allows convenient transplanting of the live fence unit without removal of the bag. Alternatively, conventional disposable materials may be used.

In an alternative implementation, container 32 may be a rigid trough-shaped container formed from plastics, wood, metal or any other suitable material.

The term "growing medium" is used herein, in the specification and claims, to refer to any medium suitable for supporting growth of the plants. The medium may be any type of soil or other inherently nutrient-containing material. Alternatively, a natural or synthetic soil substitute may be employed. In either case, nutrients are preferably supplied or supplemented by administering of suitable solid or liquid fertilizers.

Plants 36 may all be of a single variety, or may include a combination of types of plant which together form a live fence or hedge with the desired properties.

Trellis 46 may be any structure suitable for guiding growth of plants 36. Typically, trellis 46 is formed as a vertical framework adjacent to container 32 and extending parallel to its length. Where necessary, plants 36 are tied to trellis 46 by any suitable technique.

Turning now to step 20, a range of compounds are known which act as growth regulators to accelerate plant growth and can be used to improve efficiency in a range of commercial plant production. Suitable compounds include, but are not limited to, Gibberellins.

Beyond the normal functions of growth regulators, the specific combination of accelerating growth regulators together with chemical pruning agents is particularly useful in the context of the present invention. Initial application of pruning agents causes inhibition of elongation, leading to increased branching. Subsequent application of appropriate accelerating growth regulators then stimulates development of the new branches. As a result, this sequence has a very specific effect of producing concentrated lateral growth. The result is a plant structure which is ideal for fencing applications.

Chemical pruning agents suitable for use in the present invention include, but are not limited to, organic fatty acids and organic methyl esters such as dimethyl sulfoxide.

By way of a practical example, the following program may be used for implementing the method of the present invention for producing live fence units using the plant "cotoneaster". First, between one and six plants are planted in a container in a peat moss substrate and provided with fertilizer and watering appropriate for the size of plant and climatic conditions. With the onset of growth, they are sprayed with the chemical pruning agent such as dimethyl sulfoxide which causes secondary branching without significantly reducing the rate of growth. After about three months when the plants have reached a height of about 25 cm, they are re-sprayed with the same chemical. This process is repeated until the plants approach the height required for sale. Then, when the plants are about 25 cm short of their final desired height, manual pruning is performed to produce a uniform height and width. The manual pruning is typically performed towards the end of the summer, although it may be done at other times where suitable controlled conditions exist. About a month after manual pruning, the plants are sprayed with SADH which inhibits elongation of the branch sections (i.e., causes "dwarfing"), as well as additional branching, thereby generating a dense, green appearance over most of the plants. This effect remains for a period of about four to six months, after which the plants return to their normal rate of growth.

Figure 3:
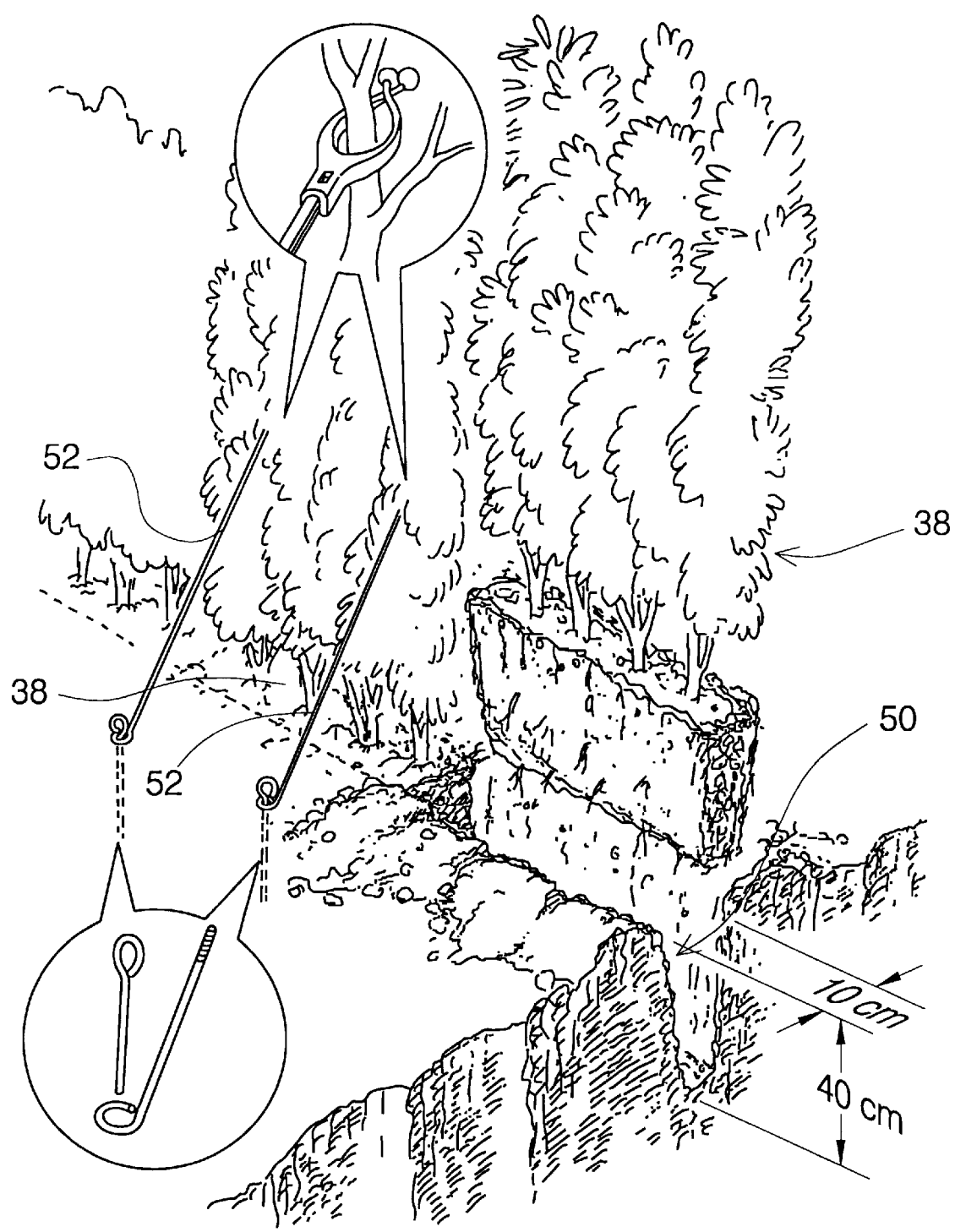
FIG. 3 is a schematic perspective view of the live fence units of FIG. 2 being transplanted to form a fence.

Turning now to FIG. 3, this illustrates how the live fence units 38 of the present invention may be used to construct a live fence. First, a trench 50 of appropriate dimensions is excavated along the path of the required fence. Then, a suitable number of units 38, with container 32 removed where necessary, are lowered into trench 50, end-to-end. Optionally, the plants 36 are initially supported by support rods 52 until they firmly take root.

Figure 4:
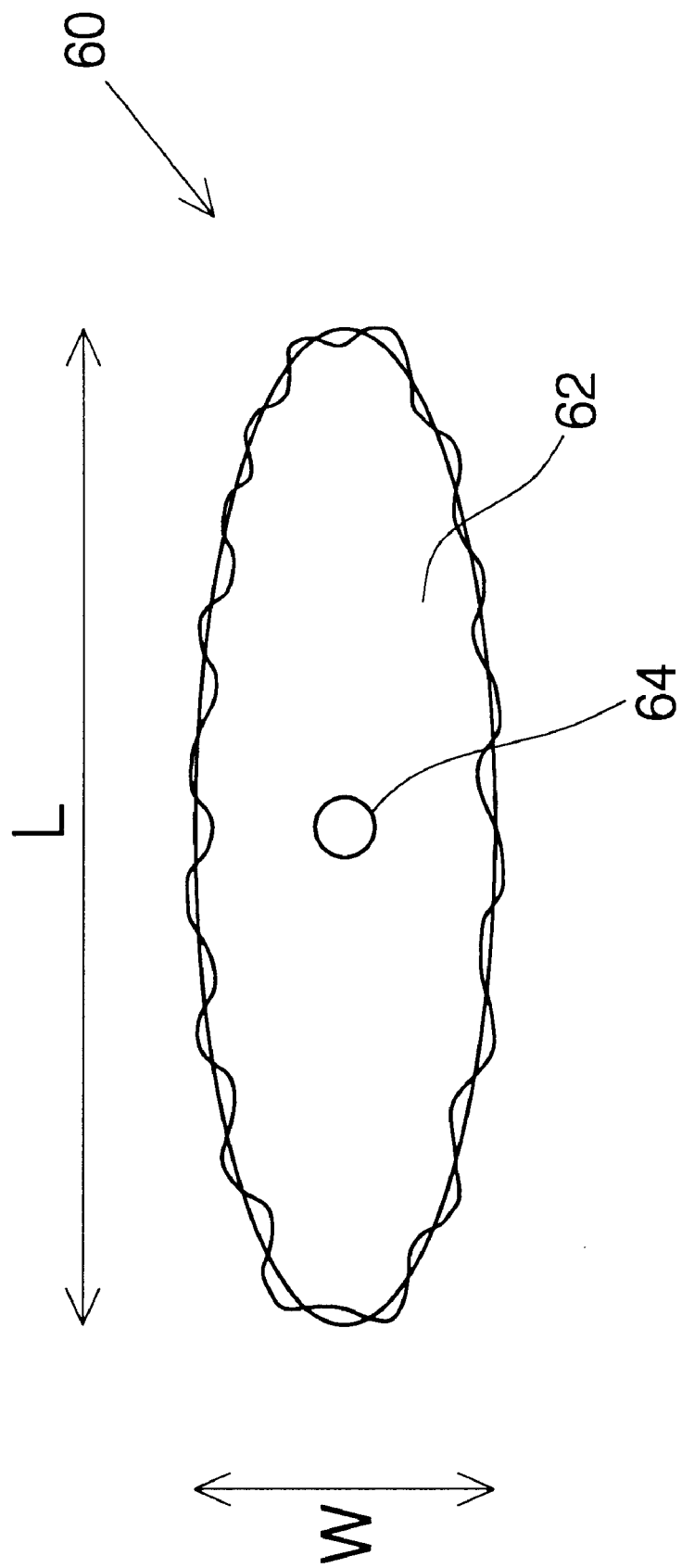
FIG. 4 is a schematic horizontal cross-sectional view of an alternative embodiment of a live fence unit, constructed and operative according to the teachings of the present invention.

Turning now to FIG. 4, this shows a live fence unit, generally designated 60, constructed and operative according to the teachings of the present invention, produced by an alternative implementation of method 10. The implementation varies primarily in that at least one plant 62 is cultivated to grow asymmetrically from a main trunk 64 such that it extends so as to have a length L which is at least about three times its width W. This enables live fence unit 60 to be produced from relatively few plants and, as in the case illustrated, even from a single plant.

Cultivation of the plant in this form can most simply be performed by use of a trellis equivalent to trellis 46 extending parallel to the length. The plant naturally tends to conform to the extensional direction of the trellis. Any branches which start to develop in directions transverse to the trellis may easily be trained by manually clipping to the trellis.

Alternatively, or additionally, manual pruning can be used to direct the plant's growth in the desired directions.

It should be noted that the "length" referred to here corresponds to the "extensional direction" referred to in the previous implementation and is measured between the outermost extents of the foliage of the plant measured horizontally. The "width" is measured between the outermost extents of the foliage measured in a horizontal direction substantially perpendicular to the length. As already mentioned, the length of each plant in this implementation is at least about three times greater than the width, and frequently at least about four times or even about five times greater than the width. In all other respects, the details of this implementation of method 10 are equivalent to those described above.

It will be appreciated that the above descriptions are intended only to serve as examples, and that many other embodiments are possible within the spirit and the scope of the present invention.

What is claimed is:

1. A method for producing a live fence comprising:
   (a) providing a plurality of containers containing a growing medium, each container being elongated in a first dimension delimited by ends of the container;
   (b) planting within each container at least two plants arrayed along said first dimension;
   (c) for each of said containers cultivating said at least two plants such that they grow in an interlocked manner to a substantially uniform approximate desired height so as to form a ready-to-plant live fence unit; and
   (d) planting the plurality of live fence units end-to-end so as to form a continuous live fence.

2. The method of claim 1, wherein said cultivating includes treating said at least two plants with a chemical pruning agent so as to increase horizontal growth of said at least two plants.

3. The method of claim 2, wherein said chemical pruning agent is chosen from the group: organic fatty acids and organic methyl esters.

4. The method of claim 2, wherein said chemical pruning agent is dimethyl sulfoxide.

5. The method of claim 1, wherein said container is a flexible bag.

6. The method of claim 5, wherein said bag is made from biodegradable material.

7. The method of claim 5, further comprising providing a secondary support around said bag for supporting said bag.

8. The method of claim 1, further comprising providing a vertical trellis adjacent to said container and extending parallel to said first dimension for guiding growth of said at least two plants.

9. The method of claim 1, further comprising treating said at least two plants with a growth regulator which accelerates growth.

10. The method of claim 9, wherein said growth regulator is a Gibberellin.

11. A method for producing a live fence comprising:
    (a) providing a plurality of containers containing a growing medium;
    (b) planting within each container at least one plant;
    (c) for each container cultivating said at least one plant to grow asymmetrically such that said at least one plant extends so as to have a first horizontal dimension termed "width" and a second horizontal dimension substantially perpendicular to said first horizontal dimension termed "length", said length being at least about three times greater than said width so as to form a ready-to-plant live fence unit; and
    (d) planting the plurality of live fence units such that said plants of adjacent containers form a continuous live fence.

12. The method of claim 11, wherein said length is at least about four times greater than said width.

13. The method of claim 11, wherein said cultivating includes treating said at least one plant with a chemical pruning agent so as to increase horizontal growth of said at least one plant.

14. The method of claim 13, wherein said chemical pruning agent is chosen from the group: organic fatty acids and organic methyl esters.

15. The method of claim 13, wherein said chemical pruning agent is dimethyl sulfoxide.

16. The method of claim 11, wherein said container is a flexible bag.

17. The method of claim 16, wherein said bag is made from biodegradable material.

18. The method of claim 16, further comprising providing a secondary support around said bag for supporting said bag.

19. The method of claim 11, further comprising providing a vertical trellis adjacent to said container and extending parallel to said length for guiding growth of said at least one plant.

20. The method of claim 11, further comprising treating said at least one plant with a growth regulator which accelerates growth.

* * * * *